June 20, 1950      J. KRAUSS      2,512,340
SMOKE TREE
Filed June 4, 1947      2 Sheets-Sheet 1
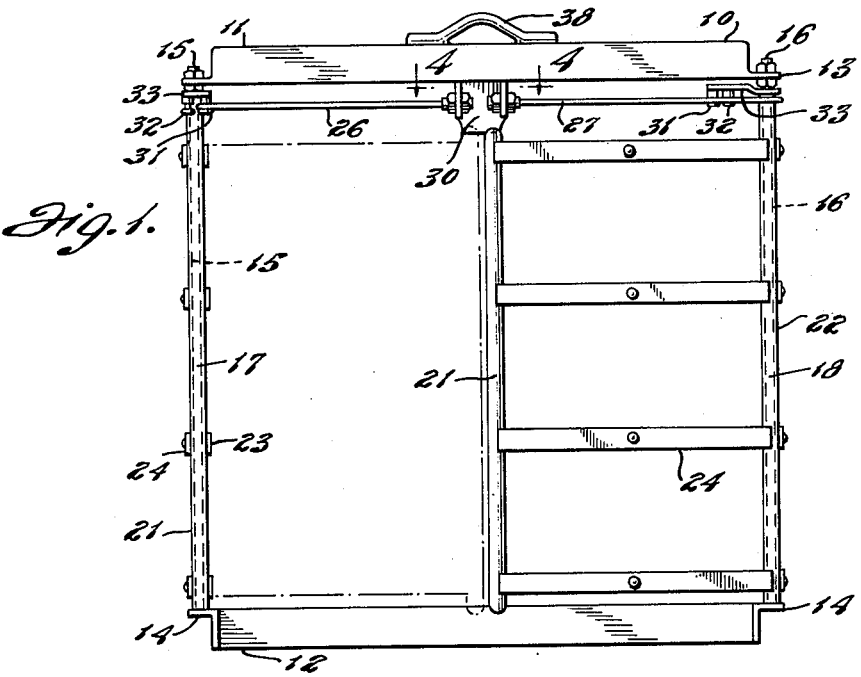
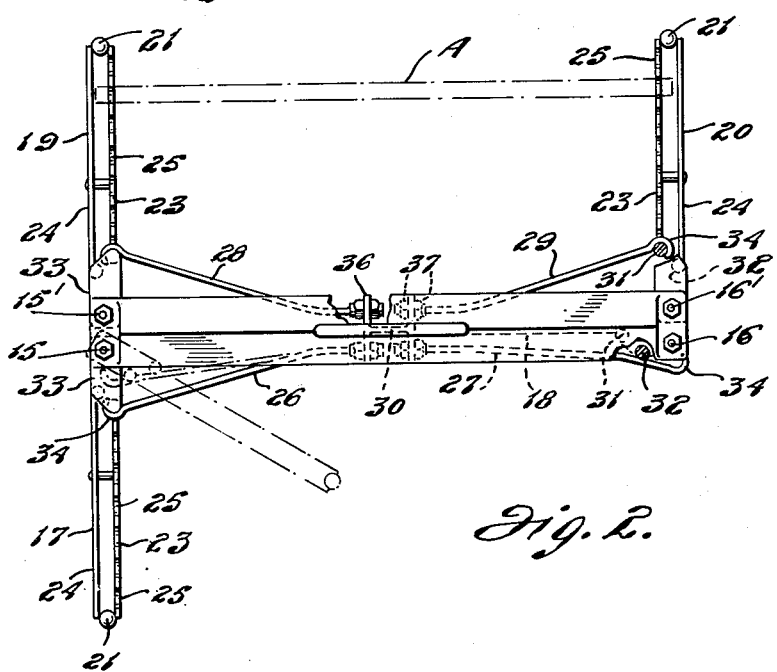
INVENTOR.
JOHN KRAUSS
BY
Clark & Ott
ATTORNEYS June 20, 1950  J. KRAUSS  2,512,340
SMOKE TREE Filed June 4, 1947  2 Sheets-Sheet 2

INVENTOR.
JOHN KRAUSS
BY Clark & Ott
ATTORNEYS

Patented June 20, 1950

2,512,340

UNITED STATES PATENT OFFICE 2,512,340

SMOKE TREE

John Krauss, Ozone Park, N. Y.

Application June 4, 1947, Serial No. 752,462

4 Claims. (Cl. 17—44.4)

This invention relates to a smoke tree for supporting meat such as sausages, bologna, hams, bacon and the like during processing thereof such as smoking, steam cooking and ice box cooling and during storage after the processing has been completed.

The invention has for an object the provision of a smoke tree which is so constructed and arranged that the meat articles to be processed may be readily and conveniently arranged thereon for processing and transferred while in position thereon from one part of the process to the other until the processing is completed as well as permitting of the convenient removal of the meat articles for inspection and from storage for shipment.

Another object of the invention is the provision of a smoke tree having members which are swingable from closed aligned position to open parallel relation for supporting the meat articles on bars suspended therefrom together with cooperating means for arresting and retaining the members in collapsed and open condition.

Still another object of the invention is the provision of arresting means for automatically moving the members to closed position upon release from open relation.

With the foregoing and other objects in view, reference is now made to the following specification and accompanying drawings in which the preferred embodiment of the invention is illustrated.

In the drawings:

Fig. 1 is a view in elevation of a smoke tree constructed in accordance with the invention and illustrating one of the swingably mounted members disposed in closed relation and another one of the swingably mounted members in open relation.

Fig. 2 is a top plan view thereof.

Figure 3:
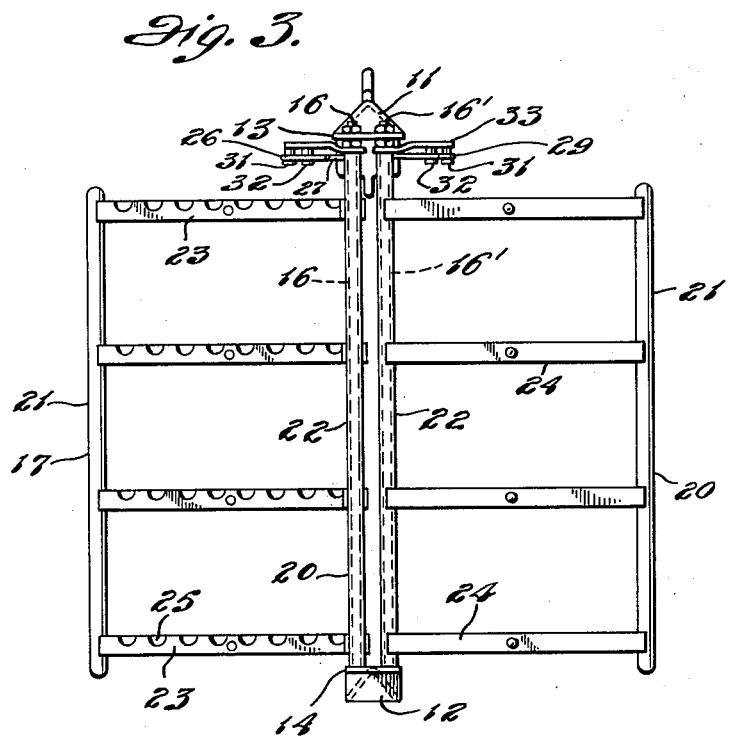
Fig. 3 is an end view of the same.
Figure 4:
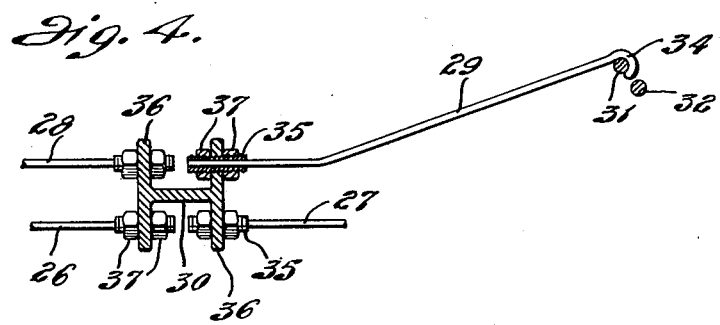
Fig. 4 is a fragmentary sectional view taken approximately on line 4—4 of Fig. 1.

Referring to the drawings by characters of reference, the smoke tree includes a rectangular supporting frame 10 consisting of top and bottom members 11 and 12 of angulated formation in cross-sectional configuration having outwardly projecting flanges 13 and 14 at their opposite ends to which pairs of vertical side rods 15 and 15′ and 16 and 16′ are secured forming the opposite side stiles of the frame.

The smoke tree also includes swingably mounted rectangular members 17, 18, 19 and 20 which are pivotally mounted on the side rods 15, 15′, 16 and 16′ respectively for swinging movement from closed position within the supporting frame 10 to an open position at right angles thereto. When in closed position the swingably mounted members 17 and 18 are located in alignment at one side of a plane extending medially through the frame 10 longitudinal thereof and when in open relation the said members extend outwardly from the frame 10 at the opposite ends thereof so as to dispose the same in spaced apart parallel relation. The swingably mounted members 19 and 20 are located in alignment within the frame 10 on the opposite side of said plane when in closed position and similarly extend outwardly from the frame in spaced apart parallel relation at the opposite ends thereof when in open relation.

The swingably mounted members each consist of oppositely disposed vertical side bars 21 and 22 and vertically spaced transversely extending flat bars 23 and 24 which are secured at their ends to the side bars 21 and 22 in spaced apart relation. The said side bars 22 each consist of a hollow tube through which extend the side rods respectively of the frame 10 to thereby pivotally connect the swingably mounted members to said frame. The bars 23 and 24 are disposed in parallel relation with the bars 23 arranged innermost and provided with longitudinally spaced arcuate notches 25 in the upper edges thereof for receiving wooden sticks A supported by and extending between the swingably mounted members 17 and 18, and 19 and 20 for supporting meat articles during processing thereof.

In order to provide means for automatically swinging the members 17, 18, 19 and 20 to closed position when released from open relation, spring bars 26, 27, 28 and 29 are provided which are secured at their inner ends to a bracket 30 depending from the underside of the top member 11 of the supporting frame 10 with the outer ends of said bars positioned to engage against lugs 31 and 32 depending from the outer ends of crank arms 33 secured to the upper ends of the side bars 22 of said swingably mounted members.

The spring bars 26, 27, 28 and 29 are formed with hooked outer ends 34 which receive and engage about the lugs 31 respectively with the said bars sprung into outwardly bowed tensioned condition thereagainst for releasably retaining the swingably mounted members in open relation.

The lugs 31 and 32 are spaced apart laterally of the crank arms 33 with the lugs 31 located closer to the ends of the arms 33 than the lugs 32 whereby the spring bars are tensioned against the lugs 31 when the swingably mounted members are released from open relation and function to automatically swing the same toward closed relation and when in partially closed relation the spring bars engage against the lugs 32 and swing the said swingably mounted members into fully closed position. In such position the spring bars are tensioned against the lugs 32 for releasably retaining the said swingably mounted members in closed position.

The spring bars 26, 27, 28 and 29 are each secured to a bushing 35 threadedly engaged in laterally projecting wings 36 of the bracket 30 for longitudinal adjustment thereof so as to dispose the hooked outer ends 34 in position to retain the swingably mounted members 17, 18, 19 and 20 in open latched relation at right angles to the supporting frame. When arranged in adjusted position the said spring bars are secured to the bracket 30 by nuts 37 threadedly engaged over the bushings 35 and tightened against the wings 36 thereof. The bracket 30 extends downwardly medial of the frame so as to provide an abutment against which the swingably mounted members engage when in closed position.

There is thus provided a smoke tree having swingably mounted members adapted to be disposed in open relation at right angles to the supporting frame with two of the swingably mounted members arranged in parallel relation on one side thereof and the other two of said members arranged in parallel relation on the other side thereof for receiving a plurality of sticks A therebetween on which meat such as sausages, bologna, ham, bacon and the like may be secured in separated relation during processing thereof such as smoking, steam cooking and cooling and during storage after the processing has been completed. When not in use the swingably mounted members 17, 18, 19 and 20 may be released from open latched position by camming of the lugs 31 out of engagement with the hooked ends 34 of the spring bars 26, 27, 28 and 29 whereby the tension of the spring bars against said lugs automatically swings the said swingably mounted members 17, 18, 19 and 20 into closed relation within the confines of the supporting frame. The supporting frame 10 is provided with a hanger bar 38 secured to the top member 11 of the supporting frame 10 for supporting the smoke tree in depending relation from hooks during the processing operation. It will be understood that pivotally mounting two of the swingably mounted members at each end of the frame to extend outwardly therefrom in opposite direction provides means whereby the smoke tree is maintained in substantially balanced relation when supported in depending relation.

What is claimed is:

1. In a smoke tree for supporting meat during processing thereof, a rigid supporting frame of rectangular formation, four rectangular shaped members pivotally connected to said supporting frame at the vertical sides thereof for swinging movement from open relation at right angles to said frame to closed position within the frame for supporting bars arranged between oppositely disposed pairs of said rectangular shaped members when in open relation, crank arms secured to said rectangular shaped members and projecting inwardly from the pivotal connections thereof with the supporting frame, vertically disposed lugs secured to said crank arms and spring bars affixed to said supporting frame and having hooked outer ends disposed in tensioned engagement against said lugs for swinging the said rectangular shaped members from open relation into closed relation and for retaining the same in latched open relation by engagement of said hooked ends with said lugs.

2. In a smoke tree for supporting meat during processing thereof, a rigid frame of rectangular formation, four rectangular shaped members pivotally connected to said rigid frame at the vertical sides thereof for swinging movement from open relation at right angles to said rigid frame to closed relation within the frame for supporting bars arranged between oppositely disposed pairs of said rectangular shaped members when in open relation, crank arms secured to said rectangular shaped members respectively and projecting inwardly from the pivotal connections thereof with the supporting frame, a pair of vertically disposed lugs secured in laterally and longitudinally spaced relation to each of said crank arms with one of said lugs on each arm located adjacent the inner end thereof and spring bars affixed to said rigid frame and having hooked outer ends disposed in tensioned engagement against the lugs located adjacent the free ends of said arms respectively when the said rectangular shaped members are in open relation for retaining the same in latched open condition and said spring bars engaging against said lugs and by the tension thereof swinging the rectangular shaped members into closed relation when released from latched open relation.

3. In a smoke tree for supporting meat during processing thereof, a rigid frame of rectangular formation, a plurality of rectangular shaped members pivotally connected to said supporting frame for swinging movement to dispose the same in closed relation within the frame and in open relation at right angles thereof for supporting sticks arranged thereon and disposed between said rectangular shaped members, crank arms secured to said rectangular shaped members respectively and projecting inwardly from the pivotal connections thereof with the rigid frame, vertically disposed lugs secured to said crank arms and spring bars affixed to said rigid frame and having hooked outer ends disposed in tensioned engagement against said lugs for swinging the rectangular shaped members into closed relation and for retaining the same in latched open condition by engagement of said hooked outer ends with said lugs.

4. In a smoke tree for supporting meat during processing thereof, a supporting frame of rectangular formation consisting of top and bottom members and two vertical side rods connected with the top and bottom members at the opposite ends thereof, four swingably mounted rectangular members having tubular ends through which the said rods extend respectively for swingably connecting the said swingably mounted members to the supporting frame for movement thereof from open relation at right angles to said frame to closed relation within the frame, two of said swingably mounted members when in open relation being disposed in spaced apart parallel condition on one side of said supporting frame with the other two of said swingably mounted members being disposed in parallel spaced apart condition on the opposite side of said supporting frame when in open relation for supporting bars arranged between said parallel disposed members when in open relation and two of said swingably mounted members being disposed in alignment on one side of a plane extending longitudinally through said supporting frame medially thereof when in closed position and the other two of said members being disposed in alignment on the other side of said plane when in closed position, crank arms secured to said swingably mounted members respectively and projecting inwardly from the pivotal connections thereof with the supporting frame, vertically disposed lugs secured to said crank arms and spring bars affixed to said supporting frame below the top member thereof and having hooked outer ends disposed in tensioned engagement against said lugs for swinging the movably mounted members into closed relation and for retaining the same in latched open relation.

JOHN KRAUSS.

REFERENCES CITED

The following references are of record in the file of this patent:

UNITED STATES PATENTS

| Number | Name | Date |
| --- | --- | --- |
| 834,057 | Hoerlein | Oct. 23, 1906 |
| 1,165,894 | Negraval | Dec. 28, 1915 |
| 1,861,871 | Morden | June 7, 1932 |
| 2,061,413 | Tropea | Nov. 17, 1936 |
| 2,265,704 | Stein | Dec. 9, 1941 |